(12) United States Patent
Bosser

(10) Patent No.: US 7,265,343 B2
(45) Date of Patent: Sep. 4, 2007

(54) APPARATUS AND METHOD FOR CALIBRATION OF AN OPTOELECTRONIC SENSOR AND FOR MENSURATION OF FEATURES ON A SUBSTRATE

(75) Inventor: Hans-Arthur Bosser, Breidenbach (DE)

(73) Assignee: Vistec Semiconductor Systems GmbH, Weilburg (DE)

( * ) Notice: Subject to any disclaimer, the term of this patent is extended or adjusted under 35 U.S.C. 154(b) by 307 days.

(21) Appl. No.: 10/604,302

(22) Filed: Jul. 9, 2003

(65) Prior Publication Data

US 2004/0108448 A1 Jun. 10, 2004

(30) Foreign Application Priority Data

Jul. 22, 2002 (DE) .............................. 102 33 175

(51) Int. Cl.
*G01D 18/00* (2006.01)
(52) U.S. Cl. ................................................. 250/252.1
(58) Field of Classification Search ............ 250/252.1, 250/201.3, 235, 559.1, 216; 356/243, 318, 356/417
See application file for complete search history.

(56) References Cited

U.S. PATENT DOCUMENTS

| | | | | | |
|---|---|---|---|---|---|
| 3,645,627 | A | * | 2/1972 | Brody et al. | ................ 356/315 |
| 5,561,290 | A | * | 10/1996 | Strobel et al. | ........... 250/252.1 |
| 5,838,435 | A | * | 11/1998 | Sandison | ................. 356/243.1 |
| 6,115,107 | A | * | 9/2000 | Nishi | ........................... 355/68 |
| 6,285,031 | B1 | * | 9/2001 | Listl et al. | ............... 250/474.1 |
| 6,355,919 | B1 | * | 3/2002 | Engelhardt | .............. 250/201.3 |
| 6,757,084 | B2 | * | 6/2004 | Kurita et al. | ............... 358/509 |
| 6,762,403 | B2 | * | 7/2004 | Schulz | .................... 250/252.1 |

\* cited by examiner

*Primary Examiner*—Constantine Hannaher
(74) *Attorney, Agent, or Firm*—Houston Eliseeva LLP

(57) ABSTRACT

The invention is based on an apparatus and a method for calibration of an optoelectronic sensor (3) that at least intermittently also receives UV light. A first response characteristic of the sensor (3) is ascertained by illuminating the sensor (3) with the light of a light source (1, 1*a*, 1*b*), varying the light quantity of the light incident onto the sensor (3), determining the magnitude of the electrical output signal of the sensor (3) as a function of the light quantity received by the sensor (3).

15 Claims, 4 Drawing Sheets

APPARATUS AND METHOD FOR CALIBRATION OF AN OPTOELECTRONIC SENSOR AND FOR MENSURATION OF FEATURES ON A SUBSTRATE

CROSS REFERENCE TO RELATED APPLICATIONS

This application claims priority of the German patent application 102 33 175.8 which is incorporated by reference herein.

BACKGROUND OF INVENTION

The invention is based on an apparatus and a method for calibration of an optoelectronic sensor, the sensor at least intermittently also receiving UV light.

The invention is further based on an apparatus and a method for mensuration of features on a substrate using a UV microscope and a spatially resolving optoelectronic sensor.

Optoelectronic sensors convert light into electrical signals and are therefore used in science and technology to detect and measure light. In cameras, spatially resolving optoelectronic sensors are used for image acquisition.

The sensors on the one hand have a dark current, i.e. even when no light is incident, they release electrons and emit an electrical signal. On the other hand, they exhibit a saturation behavior when they are illuminated with a sufficiently large light quantity. The response characteristic of the sensor extends within these boundaries. The response characteristic is substantially linear within a certain range, so that the electrical signals of the sensor are proportional to the light quantity received by the sensor.

Most of these sensors are sensitive in the visible and infrared light wavelength region. In these wavelength regions, their sensitivity and response characteristics to the acquired light do not change.

It is known, however, that UV light can influence and reduce sensor sensitivity. UV light can generate electron-hole pairs that modify the lattice structure of the sensor. Quantitative information about this is not present in the sensor manufacturers' data sheets, however, neither in general terms nor, especially, for the particular individual sensor. Changes in sensor sensitivity due to UV irradiation obviously are of no consequence for most applications. For consumers using cameras for imaging in natural ambient light, the camera's optical system is also not designed for UV light, so that the sensor also does not receive the UV component in natural ambient light.

Special sensors that can also detect UV light are available commercially. Their spectral specification generally lies in the wavelength region between 200 nm and 800 nm. The response of such a sensor, however, i.e. the electrical output signal of the sensor as compared to the incident light quantity, is much lower in the UV region than in the visible wavelength region, and is equal to only a few percent.

UV-capable sensors of this kind have a number of technical applications for measurements in the UV region. On the one hand, material analyses can be made using UV light. In the case of semiconductors, for example, information is required about material composition and optical properties. The refractive indices, absorption coefficients, and thicknesses of layers applied onto semiconductor wafers need to be determined. In particular, very thin layers can be measured more accurately with UV light than with visible light. It is necessary in this context that the signals be stable and also reproducible at a later point in time. The reproducibility of the measurements improves the material analysis, and the results are more comparable with previous results. Such measurements are accomplished by reflection at the specimen, and are performed over a wavelength range. Spectrophotometers and/or spectroellipsometers are used, in particular, for this purpose.

On the other hand, UV sensors are also used for UV imaging. The resolution of the images is improved by the use of UV light. In addition, specimen features look different under UV light, and yield additional information as compared to visible-light images. As a result, defects and very small particles on specimen surfaces of, for example, semiconductor substrates can be better detected and classified. Feature spacings and feature widths can moreover be ascertained by image processing applied to such UV images. The accuracy of the measured spacings and widths (critical dimension (CD) measurements) can be improved by means of images acquired in the UV region.

It has been discovered that especially in the context of stringent CD measurement accuracy requirements, the stability of the measurements is not sufficient. A drift of measured results in one direction is observed when specific features on a substrate are measured repeatedly over a period of time. That period can often be only a few hours. It has been found that the cause of this drift in the measured results lies in the exposure of the sensor to UV light. The exposure to UV light apparently causes permanent changes in the sensor in terms of its optoelectronic properties.

SUMMARY OF INVENTION

It is the object of the invention to describe an apparatus and a method with which changes in the properties of an optoelectronic sensor can be identified.

The object is achieved by means of a method of the kind described initially, by way of the following steps:
  ascertaining a first response characteristic of the sensor by illuminating the sensor with the light of at least one light source,
  varying the light quantity of the light incident onto the sensor,
  determining the magnitude of an electrical output signal of the sensor as a function of the light quantity received by the sensor;
  storing the first response characteristic; and
  acquiring response characteristics at later points in time after inputs of UV light onto the sensor;
  comparing the response characteristics to the first response characteristic in order to identify changes and to correct the response characteristics.

The object is additionally achieved by apparatus which comprises:—at least one light source for illuminating the sensor;
  calibration means for varying the light quantity incident onto the sensor, for ascertain a first and a present response characteristic of the sensor;
  an evaluation unit for correcting the present response characteristic of the sensor using the first one; and
  a memory for storing at least the first response characteristic.

A further object of the invention is to describe an apparatus and a method with which optical measurements can be made, and images acquired, of substrates in the UV region, and in particular with which microscopic features on substrates can be measured reliably and with high accuracy.

The object is achieved by means of a method for measuring f features on a substrate using a UV microscope and a spatially resolving optoelectronic sensor, by way of the following steps:

acquiring UV images of the features on the substrate;
calibrating the sensor from time to time, by
ascertaining a present response characteristic of the sensor by way of the variation of a light quantity received by the sensor,
comparing and correcting the present response characteristic using a first response characteristic; and
measuring the features by image processing using the corrected response characteristic of the sensor.

The object is additionally achieved by apparatus for measuring features of a substrate, comprising:

a UV microscope and a spatially resolving optoelectronic sensor for acquiring UV images of the features on the substrate;
calibration means for calibrating the sensor, wherein a first and a present response characteristic of the sensor being ascertainable by varying a light quantity incident onto the sensor; and
an evaluation unit
for correction of the present response characteristic using the first response characteristic, and
for evaluating the features by image processing using the corrected response characteristic of the sensor.

What has been recognized according to the present invention is that varying measurement results in the context of high-accuracy measurements with UV light are caused by the sensor. The response characteristic of the sensor changes as a result of the irradiation with UV light. By ascertaining and correcting the response characteristic of the sensor, the light quantity actually received can be ascertained. The measurement results derived from the sensor signals can thereby be corrected.

With the apparatuses and methods according to the present invention it is thus possible to determine quantitatively the properties of the sensor in the context of UV exposure. The changes to the sensor are brought about by UV light radiation damage. That damage depends on the total UV light dose received by the sensor. Since the radiation damage is permanent, the properties of the sensor change continuously with the received dose. A calibration of the sensor after certain dose quantities or after certain UV exposure times, in accordance with the methods and apparatus according to the present invention, results in an accurate determination of the received light quantities and therefore in accurate quantitative evaluations.

The radiation damage to the sensor depends not only on the UV intensity but also, to a certain extent, on the UV wavelength. Certain UV wavelength regions can cause greater radiation damage to the sensor.

The effect of the radiation damage on the sensor's sensitivity, on the other hand, is also wavelength-dependent. The response characteristic of the sensor is therefore preferably determined at the wavelength at which the measurements are to be taken, or the images acquired, with the sensor. If the sensor is used at several wavelengths, the calibration of the sensor is performed at those different wavelengths.

If, on the other hand, one wavelength region of the light is used for the measurements, or for illumination and image acquisition, the calibration according to the present invention of the sensor can be performed using light of that continuous wavelength region having the corresponding spectral distribution. Either the wavelength region being used is acquired continuously as overall light, or the calibration is performed at individual wavelengths from that region and then weighted or averaged for the region.

Many UV light sources not only emit a continuous spectrum but also exhibit a particularly high intensity at certain wavelengths. In many applications the UV light is therefore used specifically at those wavelengths. Such particular wavelengths are, for example, 266 nm, 248 nm, 193 mm, or 157 nm (deep UV), which are emitted by discharge lamps such as mercury/xenon or deuterium lamps, or by argon or excimer lasers. In steppers, light of these wavelengths is used to expose wafers, the features of masks being imaged onto the wafers. UV light of these wavelengths is similarly used for image acquisition in UV microscopes. Here the specimens, e.g. the features on the masks or wafers, are illuminated with UV light and imaged in a camera using a spatially resolving optoelectronic sensor, and made visible by image processing.

Other features on different materials, for example biological structures, can of course also be made visible and measured in this manner.

The radiation damage to the sensor not only is caused by illumination of the sensor with UV light but also affects the sensor's response characteristic over the sensor's entire sensitive wavelength range. The sensitivity of the sensor in visible and infrared light is therefore also impaired when it has received a certain dose of UV light. In this circumstances, calibration according to the present invention of the sensor is also necessary at the visible or infrared light wavelengths if accurate measurements are to be performed, or images acquired, in that wavelength region as well.

Images are often acquired both in the visible region and with UV light, in order to obtain additional information. Calibrations of the sensor in the corresponding visible and UV regions are therefore advantageous, especially if mensuration of the imaged specimens is to be performed by image processing.

BRIEF DESCRIPTION OF DRAWINGS

The invention will be explained below in further detail with reference to the exemplary embodiments depicted in the drawings, in which, schematically in each case.

DETAILED DESCRIPTION

Figure 1:
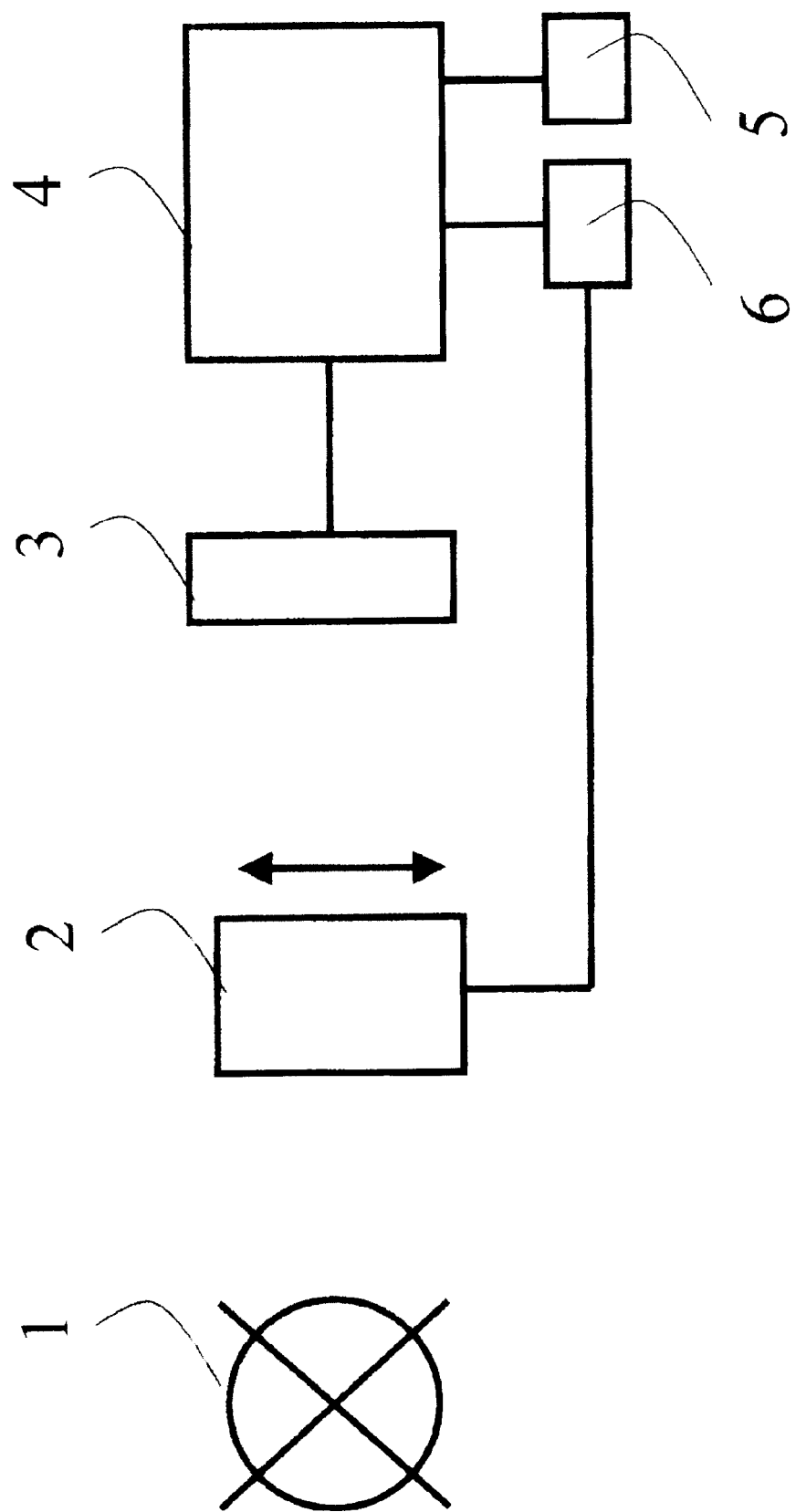
FIG. 1 shows an apparatus according to the present invention for calibration of an optoelectronic sensor.

FIG. 1 schematically shows an arrangement for calibration of an optoelectronic sensor 3, in which the change in the response characteristic of sensor 3 is ascertained. The arrangement comprises a light source 1, optoelectronic sensor 3, and an evaluation unit 4. The light emitted by light source 1 is detected by sensor 3. The latter converts the light into electrical signals which are conveyed to evaluation unit 4 and evaluated therein according to the present invention. At least one first response characteristic of sensor 3 is stored in a memory 5.

In order to ascertain the response characteristic of sensor 3, a light quantity incident upon it is varied. This is done by way of optical or electronic calibration means 2. In the exemplary embodiment according to FIG. 1, optical calibration means 2 are introduced into the beam path between light source 1 and sensor 3. Various embodiments of these calibration means 2 can be used, e.g. absorption filters, scattering filters, gray wedges, or stops. In the case of absorption and scattering filters, either the number thereof introduced into the beam path is increased, filters of identical or different absorption or scattering capability being used. Or only one filter is used in each case, and it is replaced by filters of differing absorption or scattering capability in order to vary the light quantity in controlled fashion. Alternatively, this variation can also be effected using a gray wedge, which can be extended stepwise or quasi-continuously into the beam path. The absorption filters, scattering filters, and gray wedge either are manually operated or remotely controlled using corresponding apparatuses, or are introduced automatically into the beam path by means of a control device 6. The absorption or scattering values of the filters or the gray wedge at certain positions in the beam path are known.

The same is correspondingly true of stops having known openings of different sizes, which are likewise introduced manually or automatically into the beam path as light quantity calibration means 2. Stops having a variable opening, which are operated manually or automatically, are of course also usable. The light quantity incident upon sensor 3 is varied in controlled fashion by means of variously adjusted openings. Stops having a variable aperture of this kind are sufficiently known from camera or microscope optical systems.

A further possibility, not explicitly depicted in the Figures, for embodying calibration means 2 is to vary the light quantity incident onto the sensor by way of an electronic exposure time. With an illumination intensity that is constant over time, different exposure times cause correspondingly different light quantities to arrive at sensor 3. The exposure times can be varied by means of an exposure control system. The exposure control system, for example, controls a mechanical shutter that is opened in accordance with the exposure times, or an electronic shutter. An electronic shutter is, for example, an LCD display that, by electrical activation, allows light to pass or becomes opaque. Alternatively, with appropriate activation the electronic readout of sensor 3 can also serve as an electronic shutter, the exposure times being set by way of differing lengths of time between start and stop signals to sensor 3. While sensor 3 is being read out, the electrical charges generated by the received light in sensor 3 are not taken into consideration.

In principle, the light emission of light source 1 can also be varied directly, in which case calibration means 2 vary electrical variables such as power level, voltage, or current for the operation of light source 1. Depending on the type of light source 1, however, the correlation between these electrical variables and the emitted light quantity is not known satisfactorily or with sufficient accuracy, and the necessary accuracy is not attainable with some types of light source, for example in vapor-pressure lamps (mercury/xenon).

Using calibration means 2 as described, a first response characteristic of sensor 3 is acquired before the latter is used for image acquisition or measurement purposes with ultraviolet light. The electrical signals of sensor 3 are acquired as a function of the incident light quantity, and stored in a memory 5. Any memory type is usable as memory 5. Commercially available electronic, magnetic, or optical memories are used, an embodiment as a lookup table with short readout times being simple and advantageous.

After sensor 3 has been exposed to UV light for a certain time as a result of image acquisitions or measurements, or has received a certain UV dose, a further response characteristic of sensor 3 is acquired. This is compared to the first response characteristic in order to ascertain changes and correct those changes. As a result, the modified electrical signals of sensor 3 for identical incident light quantities are corrected, and the sensor properties modified by the UV radiation are thus compensated for.

After further UV measurements or UV service with sensor 3, further response characteristics of sensor 3 are acquired and are again compared to the first response characteristic, and the changes are correspondingly corrected. Stable, reproducible light measurements that correspond to the first measurements using sensor 3 are thereby obtained. Useful examples of the application of such stable light measurements for image acquisition, image evaluation, and measurement are presented below in detail.

The response characteristic of sensor 3 is of course acquired in particular at those light wavelengths, or in those wavelength regions, that are used for the image acquisitions or measurements. Those wavelengths lie, depending on the application, in the UV region, the visible, or the infrared region.

Figure 2:
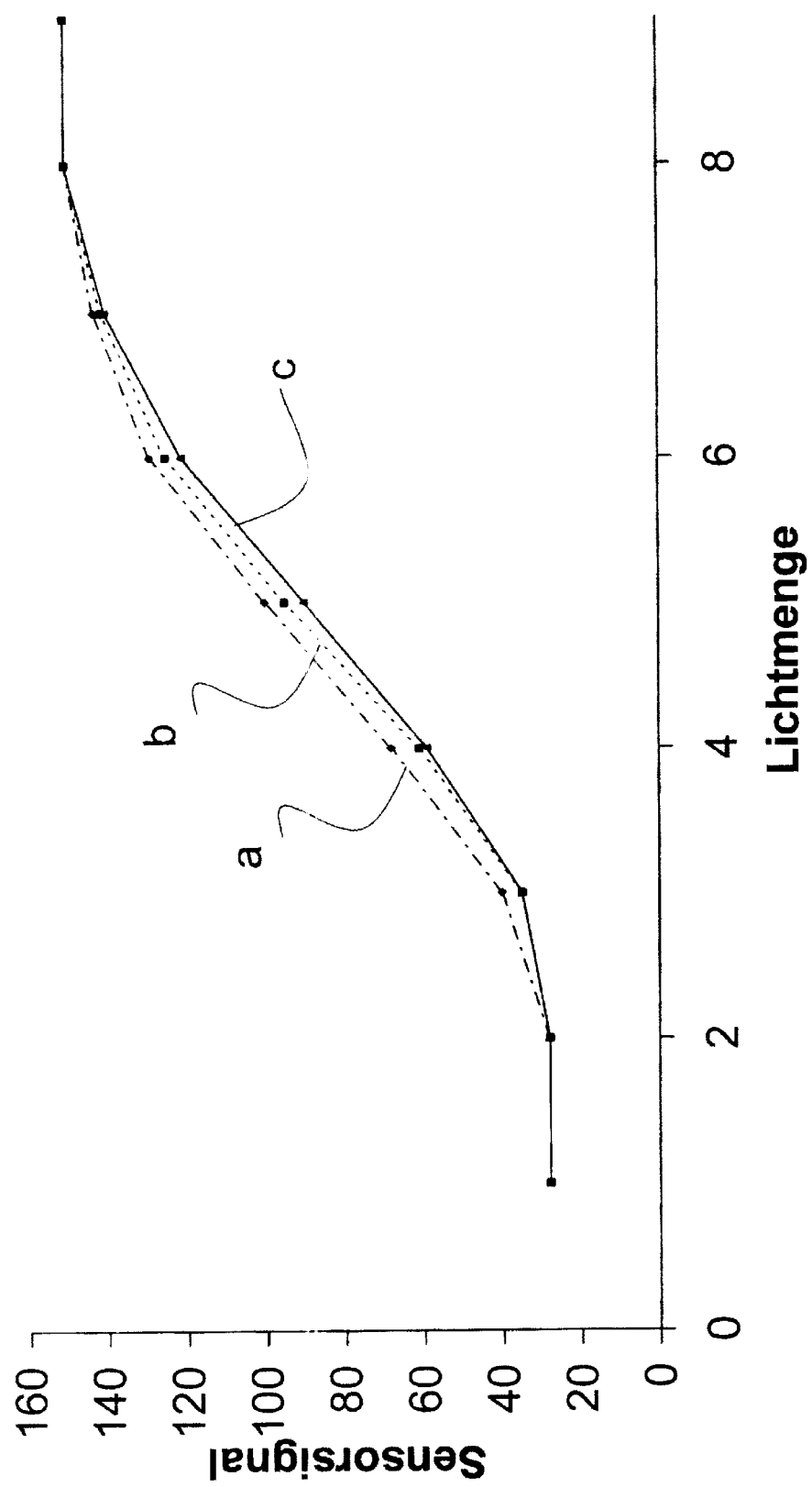
FIG. 2 shows a response characteristic of the sensor at various UV doses.

FIG. 2 presents an example of the response characteristic of sensor 3. The electrical signal of sensor 3 is plotted against the light quantity received by sensor 3, in arbitrary units. At low light quantities that are not yet detectable, the dark current of sensor 3, which is already supplying an electrical signal, is predominant. Above a certain light quantity, sensor 3 supplies electrical signals that are proportional to the incident light quantity. At very large light quantities, sensor 3 is at saturation and cannot detect any additional light.

Curve a is the response characteristic of a sensor 3 not yet illuminated with UV light. Curves b and c reproduce the response characteristic of sensor 3 after 18 hours and after 65 hours of illumination with UV light. It is evident that with increasing UV illumination, the sensitivity of sensor 3 has decreased in accordance with curves b and c. The sensor is supplying a lower electrical signal than that corresponding to the associated light quantity. The changes are compensated for by acquiring the response characteristic of sensor 3 and referring back to the first response characteristic. A conclusion as to an exact value of the light quantity actually received is thereby possible.

Further UV exposure of sensor 3 results correspondingly in further curves in addition to curves a, b, and c shown in FIG. 2. They move increasingly far away from first curve a as UV exposure increases.

Although the response characteristic is in principle identical for each sensor 3, it is quantitatively different for each individual sensor 3. For accurate measurement results, each sensor 3 must therefore be individually calibrated at time intervals, according to the invention. The changes in the response characteristic as a result of the radiation dose are not known a priori for the individual sensor 3: they are neither specified by the manufacturer nor theoretically predictable.

CCD chips are most often used as sensors 3. They can also be photodiodes. Other semiconductor sensors, or other sensor types that convert light into electrical signals, exhibit similar response characteristics.

The calibration according to the present invention of sensor 3 is accomplished from time to time. The point in time is preferably determined depending on the input of UV light onto sensor 3, i.e. on a dose-dependent basis; this can be monitored, for example, by way of the total exposure time to UV light. Calibration is, of course, also possible at fixed time intervals without regard to exposure times.

Figure 3:
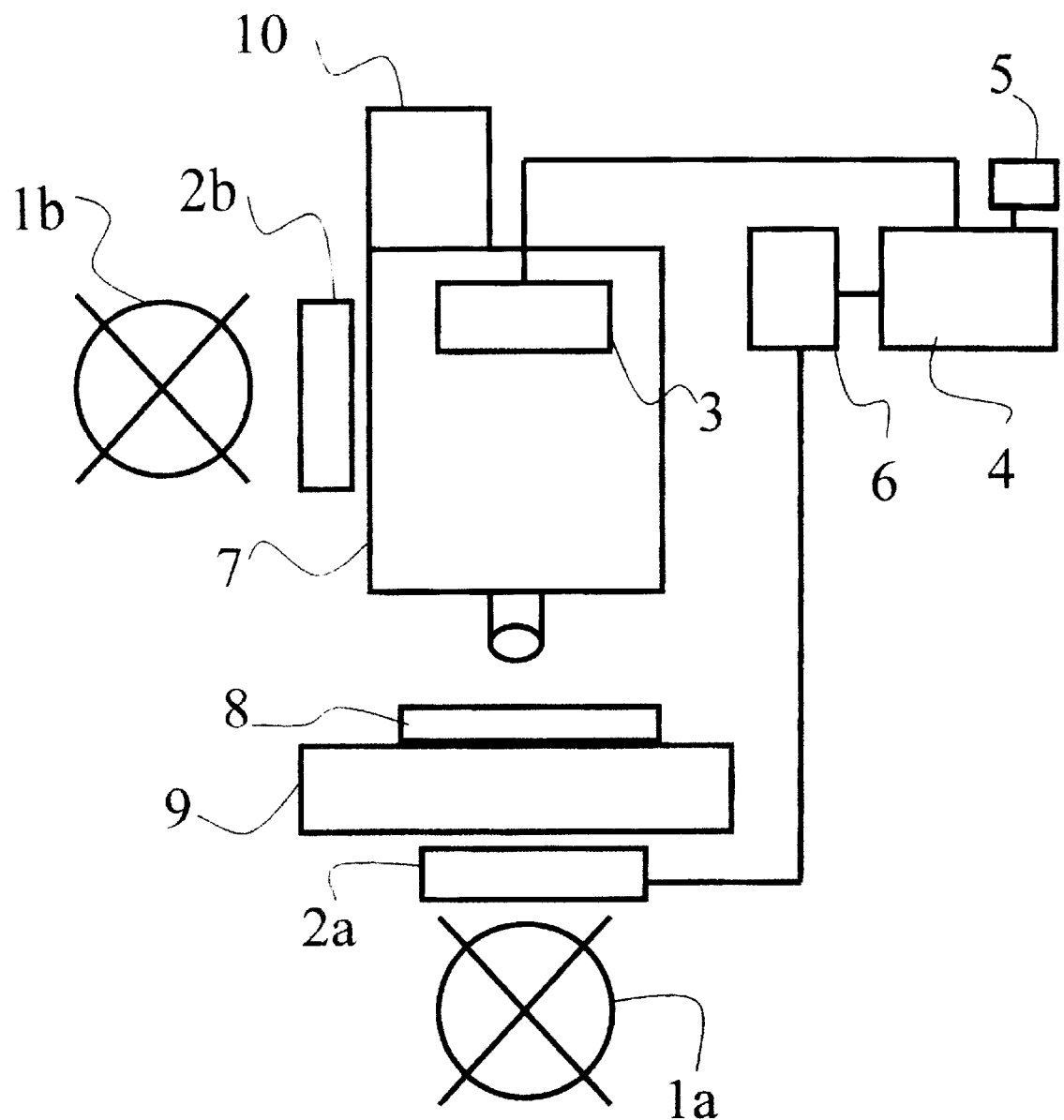
FIG. 3 shows a sample application in a microscope.

FIG. 3 shows a sample application for high-accuracy measurements using sensor 3. A microscope 7 acquires images of a substrate 8 that is located on microscope stage 9. For that purpose, substrate 8 is illuminated by a light source 1a, 1b of microscope 7. That illumination can occur, as is usual in microscopes, as incident light and, for transparent substrates, also as transmitted light. Filters or stops are correspondingly arranged as calibration means 2a and 2b in the beam path after light sources 1a and 1b, preferably in the positions shown in FIG. 3. When microscope 7 is operated with transmitted light, it is of course also possible to place various filters or stops on microscope stage 9 and to displace them correspondingly so as to bring the filters or stops successively into the beam path.

Substrate 8 has features that are imaged and measured using microscope 7 and sensor 3. Sensor 3 is, as a rule, part of a commercially available camera.

Substrate 8 is, for example, a mask comprising a glass substrate having applied features made of chromium. Such masks are used in photolithography for semiconductor production, and their features are imaged onto wafers. The features on the mask or on the wafer represent electrical circuits for the chip that is to be produced. During the production process the features are repeatedly inspected for defects and their spacings and widths are measured.

The images of the features are normally acquired using visible light. In order to obtain additional information or if the resolution of microscope 7 is insufficient for very small features using visible light, UV light is used. Improved contrast and higher resolution are achieved with UV light.

UV light in the wavelength region between, in particular, 150 nm and 420 nm is used for this purpose. Light source 1a, 1b and the optical system of microscope 7 are designed accordingly. Back-illuminated CCD cameras, full-frame transfer cameras, or interline transfer cameras, which can receive both visible light and UV light, are common as sensors 3. The features acquired using UV light are prepared by image processing and can thereby be examined for defects or for any undesired particles that may be present. Feature widths and spacings between the features are also measured by image processing.

If UV light is also used, in addition to visible light, for the examinations, the invention allows precise and reproducible measurements to be made. As already described above, this involves using, for calibrations that take place occasionally, calibration means 2a, 2b that are brought into and/or controlled in the beam path of microscope 7. Calibration means 2a, 2b are preferably actuated and controlled in fully automatic fashion using control device 6, so that the corresponding response characteristics of sensor 3 are automatically acquired and can be evaluated in evaluation unit 4 (FIG. 3). The results allow correction of the spacings and widths of substrate features measured by means of image processing.

Figure 4:
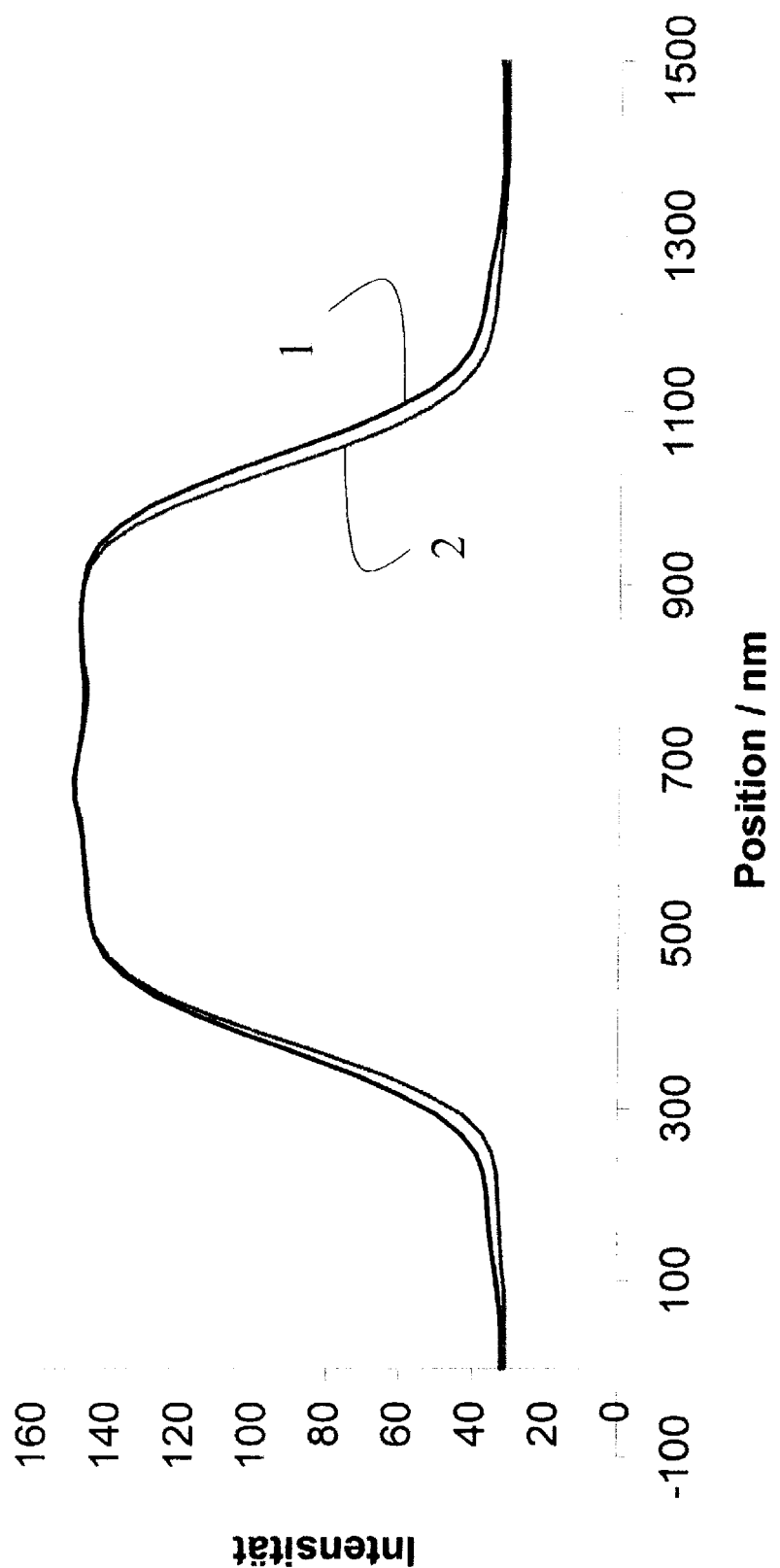
FIG. 4 shows an example of measuring the width of a feature on a substrate.

The correction is demonstrated in FIG. 4 using the example of a feature width. At a point in time, a feature is imaged using microscope 7. In FIG. 4, the relative intensity is plotted against the position of the imaged feature. The width of the feature is measured; it is equal to 650 nm (curve 1). At a later point in time, after images have been acquired with sensor 3 for several hours using UV light, the same feature is once again imaged and measured. The result is a measured feature width of 630 nm (curve 2). Because of the changes in sensor properties resulting from the UV light, sensor 3 is supplying modified signals that lead to the different measured result for the feature width. The modified signals are taken into account appropriately by way of the correction according to the present invention of the response characteristic of sensor 3, and the original measured feature width of 650 is obtained.

In the case of the example shown in FIG. 4, the feature width is acquired and measured using UV light at a wavelength of 248 nm.

The correction according to the present invention of the response characteristic of sensor 3 is also useful for other measurement tasks in which accurate quantitative evaluations of acquired light are important. Using a spectrophotometer as measurement device 10 on microscope 7, optical parameters such as the refractive index or layer thicknesses of layers on substrate 8 can be determined. These parameters are determined from spectra of the light reflected from the layers. These spectra are referred to previously measured spectra of the blank substrate 8. Since the spectra are often also acquired in the UV region, the measurement accuracy and reproducibility of the optical parameters can be improved by considering, in accordance with the present invention, the properties of the sensor of measurement device 10.

Instead of the spectrophotometer, other optical measurement arrangements, for example a spectroellipsometer, can be equipped with the methods and apparatus according to the present invention either as measurement device 10 on microscope 7, or also as self-sufficient devices independent of microscope 7. The examples shown are therefore not exhaustive.

The invention claimed is:

1. A method for calibration of an optoelectronic sensor irradiated at least intermittently with UV light, comprising the following steps:
    obtaining a first response characteristic of the sensor by illuminating the sensor with the light of at least one light source,
        varying the light quantity of the light incident onto the sensor;
        determining the magnitude of an electrical output signal of the sensor as a function of the light quantity received by the sensor;
    storing the first response characteristic; and
    acquiring response characteristics at later points in time after illuminating the sensor with UV light;
    calibrating the sensor by comparing the response characteristics to the first response characteristic in order to identify changes and to correct the response characteristics;
    wherein the method is used in a UV microscope.

2. The method as defined in claim 1, wherein the light quantity incident onto the sensor is varied by introducing at least one filter into an illuminating beam path between the light source and the sensor.

3. The method as defined in claim 2, further comprising more than one filter being an absorption filter or a scattering filter in varying numbers and/or having a varying absorption or scattering effect, or a gray wedge, disposed in the illuminating beam path.

4. The method as defined in claim 1, wherein the light quanity incident onto the sensor is varied by modifying the aperture of an aperture stop introduced into the illuminating beam between the light source and the sensor, or by way of aperture having different apertures.

5. The method as defined in claim 1, wherein feature widths and/or spacings on substrates, in particular on masks or wafers in semiconductor fabrication, are measured.

6. A method for calibration of an optoelectronic sensor irradiated at least intermittently with UV light, comprising the following steps:
   obtaining a first response characteristic of the sensor by
      illuminating the sensor with the light of at least one light source,
      varying the light quantity of the light incident onto the sensor by way of electronically controlled exposure time;
      determining the magnitude of an electrical output signal of the sensor as a function of the light quantity received by the sensor;
   storing the first response characteristic; and
   acquiring response characteristics at later points in time after illuminating the sensor with UV light;
   calibrating the sensor by comparing the response characteristics to the first response characteristic in order to identify changes and to correct the response characteristics.

7. The method as defined in claim 6, wherein the response characteristics are obtained at those light wavelengths at which the sensor is used for measurement or observation tasks.

8. A method for calibration of an optoelectronic sensor irradiated at least intermittently with UV light, comprising the following steps:
   obtaining a first response characteristic of the sensor by
      illuminating the sensor with the light of at least one light source,
      varying the light quantity of the light incident onto the sensor;
      determining the magnitude of an electrical output signal of the sensor as a function of the light quantity received by the sensor;
   storing the first response characteristic; and
   acquiring response characteristics at later points in time after illuminating the sensor with UV light;
   calibrating the sensor by comparing the response characteristics to the first response characteristic in order to identify changes and to correct the response characteristics, wherein the sensor is used as a spatially resolving sensor, and UV images are acquired with the sensor.

9. The method as defined in claim 8, wherein features of imaged specimens are measured by image processing.

10. A method for measuring features on a substrate using a UV microscope and a spatially resolving optoelectronic sensor, comprising the steps:
   acquiring UV images of the features on the substrate;
   calibrating the sensor from time to time, by
      obtaining a present response characteristic of the sensor by way of the variation of a UV light quantity received by the sensor,
      obtaining a first response characteristic obtained by illuminating the sensor with the light of at least one light source, varying the light quantity of the light incident onto the sensor, determining the magnitude of an electrical output signal of the sensor as a function of the light quantity received by the sensor, and storing the first response characteristic;
      comparing the present response characteristic to the first response characteristic and obtaining a corrected response characteristic; and
   measuring the features by image processing using the corrected response characteristic of the sensor.

11. A UV microscope for calibration of an optoelectronic sensor irradiated intermittently with UV light, comprising:
   at least one light source for illuminating the sensor;
   calibration means for varying the light quantity incident onto the sensor and for obtaining a first response and a present response characteristic of the sensor, the present response being obtained after irradiating the sensor with the UV light;
   an evaluation unit for correcting the present response characteristic of the sensor by using the first response and comparing it to the present response; and
   a memory for staring at least the first response characteristic.

12. UV microscope as defined in claim 11, wherein the calibration means are absorption filters, scattering filters, a gray wedge, aperture stops having various openings, an aperture stop having a variable opening, or an exposure control system for setting different exposure times.

13. The UV microscope as defined in claim 11 wherein a control device for automated use of the calibration means is provided.

14. The UV microscope as defined in claim 11, wherein the apparatus is provided for the measurement of feature widths and spacings.

15. An apparatus for measuring features of a substrate, comprising
   a UV microscope and a spatially resolving optoelectronic sensor for acquiring UV images of the features on the substrate;
   calibration means for calibrating the sensor, wherein a first response characteristic is obtained by illuminating the sensor with the light of at least one light source, by varying the light quantity of the light incident onto the sensor, by determining the magnitude of an electrical output signal of the sensor as a function of the light quantity received by the sensor, and wherein a present response characteristic of the sensor arc obtained by irradiating the sensor by UV light of varying a light quantity incident onto the sensor; and
   an evaluation unit
      for obtaining a corrected response characteristic by comparing the present response characteristic to the first response characteristic, and
      for evaluating the features by image processing using the corrected response characteristic of the sensor.

* * * * *

UNITED STATES PATENT AND TRADEMARK OFFICE
CERTIFICATE OF CORRECTION

| | | |
|---|---|---|
| PATENT NO. | : 7,265,343 B2 | Page 1 of 1 |
| APPLICATION NO. | : 10/604302 | |
| DATED | : September 4, 2007 | |
| INVENTOR(S) | : Hans-Artur Bösser | |

It is certified that error appears in the above-identified patent and that said Letters Patent is hereby corrected as shown below:

Title Page;
On the face sheet of the patent, at paragraph (75) Inventor: delete "Hans-Arthur Bosser" and insert --Hans-Artur Bösser--

Signed and Sealed this

Sixth Day of November, 2007

JON W. DUDAS
*Director of the United States Patent and Trademark Office*